US011317313B2

(12) United States Patent
Liu (10) Patent No.: US 11,317,313 B2
(45) Date of Patent: Apr. 26, 2022

(54) DATA DISTRIBUTION METHOD AND DEVICE, AND STORAGE MEDIUM AND SYSTEM

(71) Applicant: GUANGDONG OPPO MOBILE TELECOMMUNICATIONS CORP., LTD., Guangdong (CN)

(72) Inventor: Jianhua Liu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 102 days.

(21) Appl. No.: 16/625,610

(22) PCT Filed: Sep. 21, 2017

(86) PCT No.: PCT/CN2017/102594
§ 371 (c)(1),
(2) Date: Dec. 20, 2019

(87) PCT Pub. No.: WO2019/056244
PCT Pub. Date: Mar. 28, 2019

(65) Prior Publication Data
US 2021/0282045 A1    Sep. 9, 2021

(51) Int. Cl.
*H04W 28/02*    (2009.01)
*H04W 28/08*    (2009.01)
*H04W 72/12*    (2009.01)

(52) U.S. Cl.
CPC ....... *H04W 28/0247* (2013.01); *H04W 28/08* (2013.01); *H04W 28/0804* (2020.05); *H04W 28/02* (2013.01); *H04W 72/1252* (2013.01)

(58) Field of Classification Search
CPC ..... H04W 28/08; H04W 28/10; H04W 28/06; H04W 28/0846; H04W 28/02;
(Continued)

(56) References Cited

U.S. PATENT DOCUMENTS

2015/0201373 A1   7/2015   Fu et al.
2016/0044536 A1   2/2016   Zeng et al.
(Continued)

FOREIGN PATENT DOCUMENTS

CN   106688306 A   5/2017
CN   107679346 A   8/2017
(Continued)

OTHER PUBLICATIONS

International Search Report in the international application No. PCT/CN2017/102594, dated May 30, 2018.
(Continued)

*Primary Examiner* — Jae Y Lee
*Assistant Examiner* — Aixa A Guadalupe Cruz
(74) *Attorney, Agent, or Firm* — Ladas & Parry, LLP (57) ABSTRACT

Provided are a data distribution method and device, and a storage medium and a system. The method may comprise: receiving an access state report sent by at least one access device, wherein the access state report comprises multiple pieces of network state information for characterizing access networks provided by the corresponding access devices; and determining, based on network state information about access networks provided by various access devices and a data stream to be transmitted, data distribution amounts corresponding to various access devices. Accordingly, multi-connection data transmission control is carried out for a data stream to be transmitted, so as to improve the throughput of service data.

19 Claims, 5 Drawing Sheets

(58) Field of Classification Search
CPC ......... H04W 28/0942; H04W 28/0231; H04W 28/0236; H04W 28/0925; H04W 28/0247; H04W 28/0804; H04W 72/04; H04W 72/00; H04W 72/02; H04W 72/0406; H04W 72/0413; H04W 72/042; H04W 72/005; H04W 72/14; H04W 76/04; H04W 76/046; H04W 74/00; H04W 74/04; H04W 74/08; H04W 74/0833; H04W 74/02; H04W 74/006; H04W 88/02; H04W 88/08; H04L 5/0091; H04L 5/0078; H04L 5/0053; H04L 5/0044; H04L 1/0003

See application file for complete search history.

(56) References Cited

U.S. PATENT DOCUMENTS

| | | | |
|---|---|---|---|
| 2016/0119939 A1 | 4/2016 | Himayat et al. | |
| 2016/0302077 A1 | 10/2016 | Yi et al. | |
| 2016/0338068 A1 | 11/2016 | Cheng et al. | |
| 2018/0262924 A1* | 9/2018 | Dao | H04W 72/1257 |
| 2018/0331944 A1* | 11/2018 | Salkintzis | H04L 45/38 |
| 2019/0274067 A1 | 9/2019 | Zeng et al. | |
| 2021/0100047 A1* | 4/2021 | Chiba | H04W 28/0252 |

FOREIGN PATENT DOCUMENTS

| | | |
|---|---|---|
| EP | 2884711 A1 | 6/2015 |
| EP | 2991418 A1 | 3/2016 |
| RU | 2553663 C1 | 6/2015 |
| WO | 2016163696 A1 | 10/2016 |
| WO | 2017027053 A1 | 2/2017 |
| WO | WO-2019010702 A1 * 1/2019 ............ H04L 45/24 |  |

OTHER PUBLICATIONS

Qualcomm Incorporated et al. Introducing UE Throughput Indication. 3GPP TSG-RAN WG3 Meeting #94 R3-163033. Nov. 18, 2016 (Nov. 18, 2016), pp. 1, 3-6 and 9.

First Office Action of the Russian application No. 2020101943, dated Jan. 15, 2021.

First Office Action of the European application No. 17926021.1, dated Jan. 21, 2021.

Office Action of the Indian application No. 201917053986, dated Mar. 25, 2021.

Supplementary European Search Report in the European application No. 17926021.1, dated May 6, 2020.

BT PLC: "ATSSS architecture requirements and initial reference architecture", 3GPP Draft; S2-175683_ATSSS-ARCH REQS and REF ARCH—Updated, 3rd Generation Partnership Project (3GPP), Mobile Competence Centre ; 650, Route Des Lucioles ; F-06921 Sophia-Antipolis Cedex France, vol. SA WG2, No. Sophia Antipolis, France; Aug. 21, 2017-Aug. 25, 2017 Aug. 15, 2017 (Aug. 15, 2017), XP051335150, paragraph [0001], paragraph [4 .1.1]; figure X.

English translation of the Written Opinion of the International Search Authority in the international application No. PCT/CN2017/102594, dated May 30, 2018.

Written Opinion of the Singaporean application No. 11201912460W, dated Nov. 8, 2021.

* cited by examiner

FIG. 1

```
Receive access state reports from at least two access
devices, where each of the access state reports includes
multiple pieces of network state information for
characterizing a network state of an access network
provided by an access device corresponding to the access
state report
```
— S201

```
Determine a distributed data amount corresponding to the
access device based on a data stream to be transmitted and
the network state information of the access network
provided by the access device
```
— S202

FIG. 2

```
Allocate, according to a set weight allocation strategy, a
weight to network state information of an access network
provided by each of the at least two access devices
```
— S2021

```
Determine, based on the network state information of the
access network provided by the access network and the
weight corresponding to the network state information, a
data distribution calculated value corresponding to the
access network provided by the access device
```
— S2022

```
Divide a data stream to be transmitted according to the data
distribution calculated value corresponding to the access
network provided by the access device to determine a
distributed data amount corresponding to the access device
```
— S2023

DATA DISTRIBUTION METHOD AND DEVICE, AND STORAGE MEDIUM AND SYSTEM

CROSS-REFERENCE TO RELATED APPLICATION

This application is the U.S. national phase of PCT/CN2017/102594, filed on Sep. 21, 2017, the disclosure of which is incorporated by reference herein in its entirety.

TECHNICAL FIELD

The disclosure relates to the technical field of wireless communications, and more particularly to a method and device for data distribution, a storage medium and a system.

BACKGROUND

With the development of communication technologies, researches on 5th generation mobile communication technology (5G) have been made. In a 5G system, multi-connection data transmission is one of key technologies for a 5G network. Multi-connection data transmission refers to that a terminal may perform data transmission with a network side through communication links provided by multiple types of networks. For example, the terminal may perform data transmission with the network side through a communication link provided by a network supporting 3rd generation partnership project (3GPP) specification and a communication link provided by a network supporting non-3GPP specification, and the terminal may also perform data transmission with the network side through communication links provided by different 3GPP radio access technology (RAT) networks.

Therefore, for the 5G system, when supporting multi-connection data transmission, how to control a data stream to be transmitted is a technical problem that needs to be solved at present.

SUMMARY

For solving the technical problem, the disclosure is intended to provide a method and device for data transmission, a storage medium and a system, which may implement multi-connection data transmission control for a data stream to be transmitted to improve a throughput of service data.

The technical solutions of the embodiments of the disclosure are implemented as follows.

According to a first aspect, the embodiments of the disclosure provide a method for data distribution, which may be applied to a service access management node and include the following operations.

An access state report from each of at least one access device is received, where the access state report includes multiple pieces of network state information for characterizing a network state of an access network provided by the access device.

A distributed data amount corresponding to the access device is determined based on a data stream to be transmitted and the network state information of the access network provided by the access device.

According to a second aspect, the embodiments of the disclosure provide a method for data distribution, which may be applied to an access device and include the following operation.

An access state report of an access network provided by the access device is transmitted to a service access management node, where the access state report includes multiple pieces of network state information for characterizing a network state of the access network provided by the access device, and is used for the service access management node to determine a distributed data amount corresponding to the access device according to a data stream to be transmitted.

According to a third aspect, the embodiments of the disclosure provide a service access management node, which may include a first receiving portion and a determination portion.

The first receiving portion may be configured to receive an access state report from each of at least one access device, where the access state report includes multiple pieces of network state information for characterizing a network state of an access network provided by the access device.

The determination portion may be configured to determine a distributed data amount corresponding to the access device based on a data stream to be transmitted and the network state information of the access network provided by the access device.

According to a fourth aspect, the embodiments of the disclosure provide an access device, which may include a second transmission portion, configured to transmit an access state report of an access network provided by the access device to a service access management node, wherein the access state report includes multiple pieces of network state information for characterizing a network state of the access network provided by the access device, and is used for the service access management node to determine a distributed data amount corresponding to the access device according to a data stream to be transmitted.

According to a fifth aspect, the embodiments of the disclosure provide a service access management node, which may include a first network interface, a first memory and a first processor.

The first network interface may be configured to receive and send a signal in a process of receiving and transmitting information with another external network element.

The first memory may be configured to store a computer program capable of running in the first processor.

The first processor may be configured to run the computer program to execute the method in the first aspect.

According to a sixth aspect, the embodiments of the disclosure provide an access device, which may include a second network interface, a second memory and a second processor.

The second network interface may be configured to receive and send a signal in a process of receiving and transmitting information with another external network element.

The second memory may be configured to store a computer program capable of running in the second processor.

The second processor may be configured to run the computer program to execute the method in the second aspect.

According to a seventh aspect, the embodiments of the disclosure provide a computer-readable medium having stored therein a data distribution program that, when executed by at least one processor, causes the at least one processor to implement the method in the first aspect.

According to an eighth aspect, the embodiments of the disclosure provide a computer-readable medium having stored therein a data distribution program that, when executed by at least one processor, causes the at least one processor to implement the method in the second aspect.

According to a ninth aspect, the embodiments of the disclosure provide a system for data distribution, which may include a service access management node and at least one access device.

The access device may be configured to transmit an access state report of an access network provided by the access device to the service access management node, where the access state report includes multiple pieces of network state information for characterizing a network state of the access network provided by the access device.

The service access management node may be configured to receive the access state report from each of the at least one access device, and determine a distributed data amount corresponding to the access device based on a data stream to be transmitted and the network state information of the access network provided by the access device.

The embodiments of the disclosure provide the method and device for data distribution, the storage medium and the system for data distribution. The service access management node receives the access network state report from each access device to learn the network state information of the access network provided by the access device, divides the data stream to be transmitted based on the network state information of the access network, and determines the distributed data amount corresponding to the access device, thereby implementing multi-connection data transmission control for the data stream to be transmitted and improving a throughput of service data.

DETAILED DESCRIPTION

For making the characteristics and technical contents of the embodiments of the disclosure understood in more detail, implementation of the embodiments of the disclosure will be described below in combination with the drawings in detail. The drawings are only adopted for description as references and not intended to limit the embodiments of the disclosure.

Figure 1:
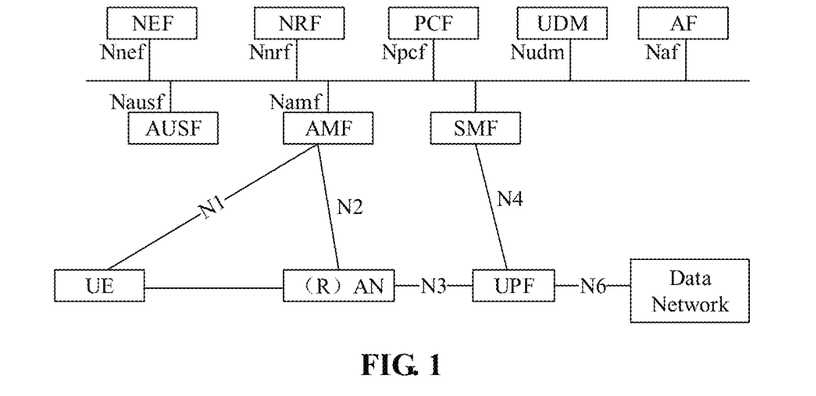
FIG. 1 is a schematic diagram of an underlying network infrastructure of 5G.

Referring to FIG. 1, an underlying network architecture with multi-access, also called a service-based architecture (SBA), of 5G is illustrated. As illustrated in FIG. 1, a user equipment (UE) accesses a core access and mobility management function (AMF) entity through a (radio) access network ((R)AN), and the UE may also directly access the AMF. The AMF is configured to process a control-plane message of the network, and is similar to an evolved packet system (EPS) mobility management (EMM) entity in a mobility management entity (MME) in a long term evolution (LTE) system. An authentication server function (AUSF) entity, similar to an authentication function entity in the MME in the LTE system, implements two-way authentication over the UE and supports a unified authentication framework. A user-plane function (UPF) entity is similar to integration of a service gateway (S-GW) and a packet data network (PDN) gateway (P-GW) in the LTE system, and is connected with a data network. A session management function (SMF) entity is similar to an EPS session management (ESM) function entity in the LTE system, and mainly manages, sets up, modifies and releases a session. It may be seen that an integration of the AUSF, the AMF and the SMF is similar to the MME in the LTE system. In addition, FIG. 1 further illustrates a network exposure function (NEF) entity, a NF repository function (NRF) entity, a policy control function (PCF) entity, a unified data management (UDM) entity and an application function (AF) entity. The NEF is configured to show some capabilities of network functions to the outside, for example, a monitoring capability, a supply capability and a policy or charging capability. The NRF may support a service discovery function. The PCF supports a unified policy framework for managing network behaviors. The UDM includes a front end (FE) and a user data repository (UDR). The FE may access subscriber information in the UDR. The UDM is similar to a home subscriber server (HSS) in the LTE system. The UDR provides subscription data storage service. The FE provides a data-based application logic. The AF is configured to provide application service.

From the above network architecture, it may be seen that an architecture between the (R)AN and the data network may be called a 5G core network. A network element in the 5G core network is called a 5G core network element. In 5G, a terminal is allowed to implement multi-connection data transmission through communication links of multiple types of access networks. The multiple types of access networks may include an access network supporting 3GPP specification, such as an access network adopting a 5G new radio (NR) access technology, LTE access technology and the like, and may also include an access network supporting a non-3GPP specification, for example, a wireless-fidelity (WIFI) network. Elaborations thereof are omitted in the embodiments.

For implementing data stream transmission control for multi-connection data transmission in a 5G network, in the embodiments of the disclosure, a service access management node (ATSSS/AT3SF) is additionally provided in the network architecture illustrated in FIG. 1 to control a data stream to be transmitted in multi-connection transmission. When the data stream to be transmitted is a downlink data stream, the service access management node may be arranged, as an independent network element entity, between the (R)AN and the 5G core network element and may also be distributed in a network element with a requirement on data transmission with the UE in the 5G core network, such as the UDM, the SMF, the PCF and the UPF. Elaborations thereof are omitted in the embodiments. When the data stream to be transmitted is an uplink data stream, the service access management node is positioned, as an independent network element entity, between the (R)AN and the UE, and may also be integrated in the UE. Elaborations thereof are also omitted in the embodiments.

In the embodiments of the disclosure, the service access management node ATSSS receives an access network state report from each of access devices that provide access network communication links, and determines a distributed data amount corresponding to the access device, of the data stream to be transmitted based on the received access network state report, thereby implementing multi-connection data transmission control for the data stream to be transmitted to improve a throughput of service data.

The following embodiments are proposed based on the above contents.

First Embodiment

Figure 2:
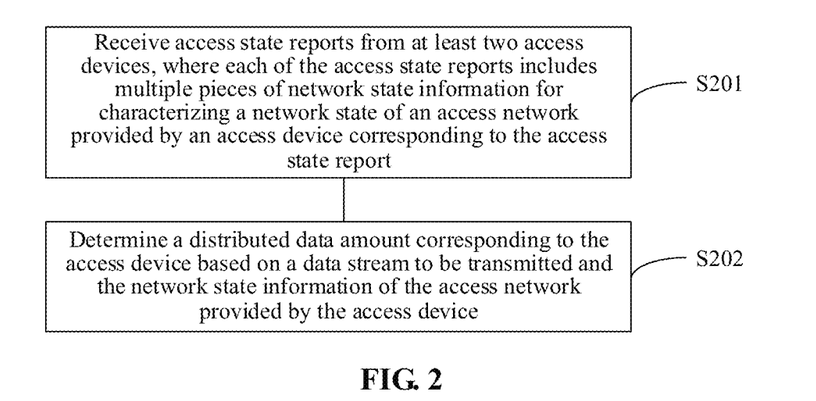
FIG. 2 is a flowchart of a method for data distribution according to an embodiment of the disclosure.

Referring to FIG. 2, a method for data distribution provided in the embodiment of the disclosure is illustrated. The method is applied to a service access management node and includes the following operations.

At block S201, an access state report from each of at least one access device is received. The access state report includes multiple pieces of network state information used for characterizing a network state of an access network provided by the access device.

At block S202, a distributed data amount corresponding to the access device is determined based on a data stream to be transmitted and the network state information of the access network provided by the access device.

It is to be noted that, no matter whether the data stream to be transmitted is an uplink data stream or a downlink data stream, the service access management node may receive the access state report from the access device, thereby determining the distributed data amount corresponding to the access device according to the access state report.

It may be understood that the access networks provided by multiple access devices that provides multiple connections may not only include an access network complying with a 3GPP specification, for example, an access network provided by a 5G gNB, and an access network complying with a non-3GPP specification, for example, an access network provided by a WIFI access point, but also include access networks adopting different RATs in a 3GPP specification, for example, access networks provided by the 5G gNB and an Evolved Node B (eNB) in LTE.

Through the technical solution illustrated in FIG. 2, the service access management node learns, through the access state report, the network state information of the access network provided by each access device, and determines the distributed data amount corresponding to the access device based on the network state information, thereby implementing multi-connection data transmission control for the data stream to be transmitted to improve a throughput of service data.

For the technical solution illustrated in FIG. 2, in a possible implementation, when the access network provided by the access device is an access network supporting a non-3GPP specification, the access state report includes at least one piece of the following network state information: basic service set (BSS) load information, wide area network (WAN) metrics information, a utilization rate of an available channel, a data amount to be transmitted, or a number of accessed UEs. It may be understood that all of the items may characterize the network state of the access network that supports the non-3GPP specification. Besides the above items, other information capable of characterizing the network state of the non-3GPP access network may also be included in the access state report. Elaborations thereof are omitted in the embodiment.

For the technical solution illustrated in FIG. 2, in a possible implementation, when the access network provided by the access device is an access network supporting a 3GPP specification, the access state report includes at least one piece of the following network state information: load information of the access network, a number of accessed UEs of the access network, a data amount to be transmitted presently cached by the access network, a present resource utilization rate of the access network, a user throughput of the access network within a preset time period, or information about a data packet that is not transmitted correctly by the access network. It may be understood that all of the items may characterize the network state of the 3GPP access network. Besides the above items, other information capable of characterizing the network state of the 3GPP access network may also be included in the access state report. Elaborations thereof are omitted in the embodiment.

For the possible implementation, the information about data packet that is not transmitted correctly by the access network includes at least one of:

a sequence number of a data packet that has been transmitted but not transmitted successfully by the access network;

a minimum sequence number of among sequence numbers of data packets to be transmitted by the access network; or a proportion of a number of data packets that are transmitted wrongly by the access network to a total number of data packets that are transmitted by the access network within the preset time period.

For the technical solution illustrated in FIG. 2, in a possible implementation, the access state report may be requested to be acquired by the service access management node. Therefore, before the operation that the access state report from each of the at least one access device is received, the method further includes the following operation.

A request message for the access state report is transmitted to the access device.

For the technical solution illustrated in FIG. 2, in a possible implementation, the access state report may be periodically reported by the access device. Therefore, the operation of receiving the access state report from each of the at least one access device includes the following operation.

The access state report transmitted by the access device is received according to a preset periodic interval.

For the technical solution illustrated in FIG. 2, in a possible implementation, the access state report may be reported by the access device in an event triggering form. Therefore, the operation of receiving the access state report from each of the at least one access device includes the following operation.

The access state report transmitted by the access device based on a preset triggering event is received.

For the technical solution illustrated in FIG. 2, in a possible implementation, when data distribution is required to be performed on the data stream to be transmitted, the distributed data amount corresponding to each access device should be determined based on the network state information of the access network provided by the access device. When the network state information may feature that the network state of the access network is relatively good, most of the data stream to be transmitted may be distributed to the access network in the relatively good network state. When the network state information may feature that the network state of the access network is poor, a small part of the data stream to be transmitted may be distributed to the access network in the poor network state. Therefore, referring to FIG. 3, the operation that the distributed data amount corresponding to the access device is determined based on the data stream to be transmitted and the network state information of the access network provided by the access device includes the following operations.

Figure 3:
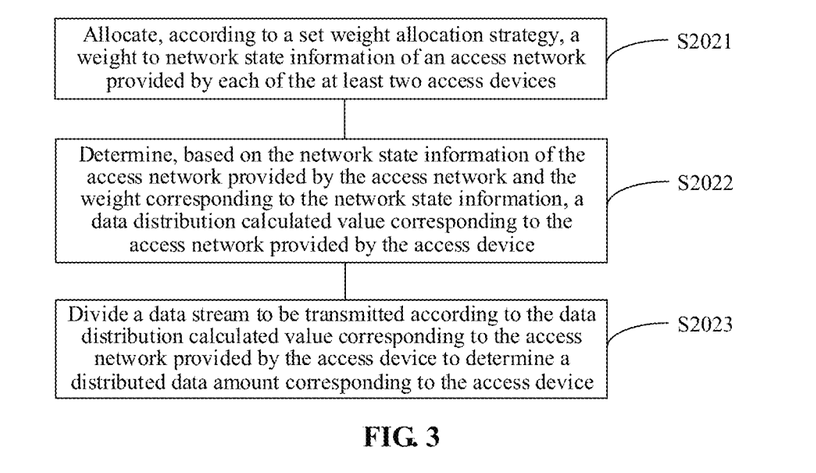
FIG. 3 is a flowchart of determining a distributed data amount according to an embodiment of the disclosure.

At block S2021, a weight is allocated, according to a set weight allocation strategy, to the network state information of the access network provided by the access device.

At block S2022, a data distribution calculated value corresponding to the access network provided by the access device is determined based on the network state information of the access network provided by the access device and the weight corresponding to the network state information.

At block S2023, the data stream to be transmitted is divided based on the data distribution calculated value corresponding to the access network provided by the access device to determine the distributed data amount corresponding to the access device.

Specifically, for the access state reports of the two types of access networks, each of the access state reports includes at least one piece of network state information. Therefore, when the network state of the access network needs to be characterized through the at least one piece of network state information in the access state report, a weight may be allocated to each of the at least one piece of network state information in the access state report, then the content of the network state information is multiplied by the weight corresponding to the network state information, summation is performed on product results of the at least one piece of the network state information to determine a data distribution calculated value of the access network, so as to score the network state of the access network. The data distribution calculated value may be used for characterizing whether the network state of the access network is good or not.

Through the solution, the service access management node receives the access network state report transmitted by each access device to learn the network state information of the access network provided by the access device, divides the data stream to be transmitted based on the network state information of the access network, and determines the distributed data amount corresponding to the access device, thereby implementing multi-connection data transmission control for the data stream to be transmitted and improve a throughput of service data.

Second Embodiment

Figure 4:
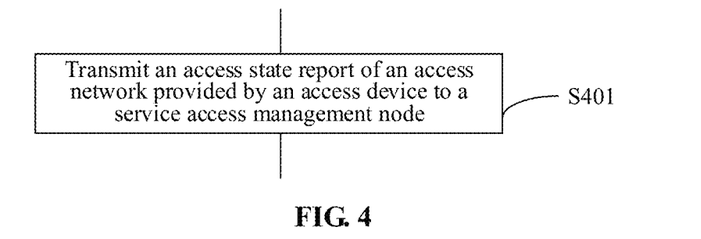
FIG. 4 is a flowchart of another method for data distribution according to an embodiment of the disclosure.

Based on the same inventive concept of the abovementioned embodiment, referring to FIG. 4, a data distribution method provided in the embodiment of the disclosure is illustrated. The method is applied to an access device. The method includes the following operation.

At block S401, an access state report of an access network provided by the access device is transmitted to a service access management node.

The access state report includes multiple pieces of network state information for characterizing a network state of the access network provided by the access device. The access state report is further used for the service access management node to determine a distributed data amount corresponding to the access device according to a data stream to be transmitted.

For the technical solution illustrated in FIG. 4, in a possible implementation, when the access network provided by the access device is an access network supporting a non-3GPP specification, the access state report includes at least one piece of the following network state information: BSS load information, WAN metrics information, a utilization rate of an available channel, a data amount to be transmitted, or a number of accessed UEs.

For the technical solution illustrated in FIG. 4, in a possible implementation, when the access network provided by the access device is an access network supporting a 3GPP specification, the access state report includes at least one piece of the following network state information: load information of the access network, a number of accessed UEs of the access network, a data amount to be transmitted presently cached by the access network, a present resource utilization rate of the access network, a user throughput of the access network within a preset time period, or information about a data packet that is not transmitted correctly by the access network.

In the possible implementation, the information about the data packet that is not transmitted correctly by the access network includes at least one of:

a sequence number of a data packet that has been transmitted but not transmitted successfully by the access network;

a minimum sequence number among sequence numbers of data packets to be transmitted by the access network; or a proportion of a number of data packets that are transmitted wrongly by the access network to a total number of data packets that are transmitted by the access network within the preset time period.

For the technical solution illustrated in FIG. 4, in a possible implementation, the access state report may be requested to be acquired by the service access management node. Therefore, before the operation that the access state report of the access network provided by the access device is transmitted to the service access management node, the method further includes the following operation.

A request message for the access state report is received from the service access management node.

For the technical solution illustrated in FIG. 4, in a possible implementation, the access state report may be periodically reported. Therefore, the operation that the access state report of the access network provided by the access device is transmitted to the service access management node includes the following operation.

The access state report of the access network provided by the access device is transmitted to the service access management node according to a preset periodic interval.

For the technical solution illustrated in FIG. 4, in a possible implementation, the access state report may be reported in an event triggering form. Therefore, the operation that the access state report of the access network provided by the access device is transmitted to the service access management node includes the following operation.

The access state report of the access network provided by the access device is transmitted to the service access management node based on a preset triggering event.

In the implementation, specifically, the operation that the access state report of the access network provided by the access device is transmitted to the service access management node based on the preset triggering event includes the following operations.

When the network state information characterized in the access state report and a pre-configured threshold satisfy a preset judgment condition, the access state report of the access network provided by the access device is transmitted to the service access management node; or, when the network state information characterized in the access state report and the pre-configured threshold satisfy the preset judgment condition, the access state report of the access network provided by the access device is transmitted to the service access management node according to the preset periodic interval until the judgment condition is not satisfied; or, when the network state information characterized in the access state report and the pre-configured threshold satisfy the preset judgment condition, the access state report of the access network provided by the access device is transmitted to the service access management node according to the preset periodic interval until timeout of a set timing period; or, when the network state information characterized in the access state report and the pre-configured threshold satisfy the preset judgment condition, the access state report of the access network provided by the access device is transmitted to the service access management node according to a predefined number of transmission times.

According to the data distribution method provided in the embodiment, the access device transmits the access state report to the service access management node, thereby enabling the service access management node to learn the network state of the access network through the access state report and distribute the data stream to be transmitted according to the network state of the access network. Multi-connection data transmission control is implemented for the data stream to be transmitted, and a throughput of service data is improved.

Third Embodiment

Figure 5:
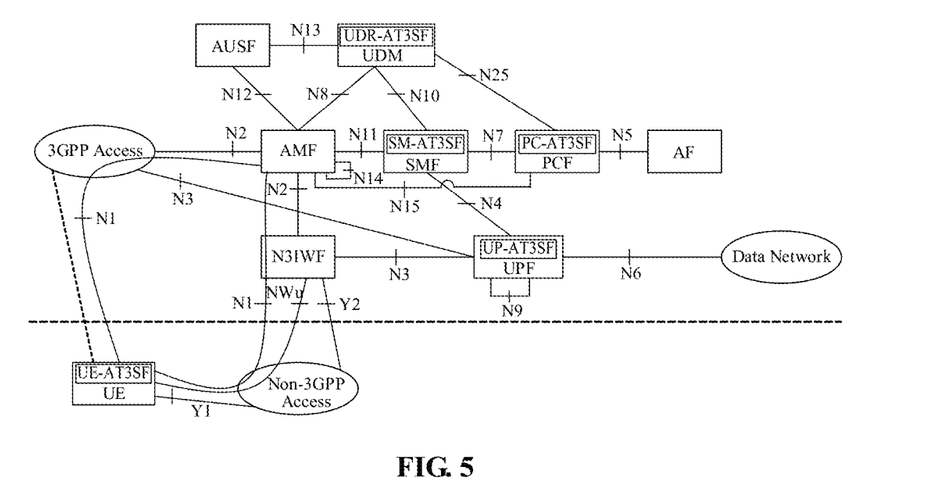
FIG. 5 is a schematic diagram of a network architecture according to an embodiment of the disclosure.
Figure 6:
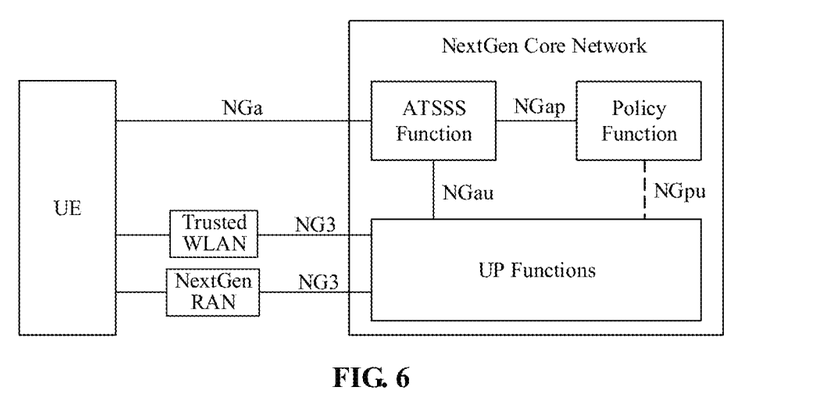
FIG. 6 is a schematic diagram of another network architecture according to an embodiment of the disclosure.
Figure 7:
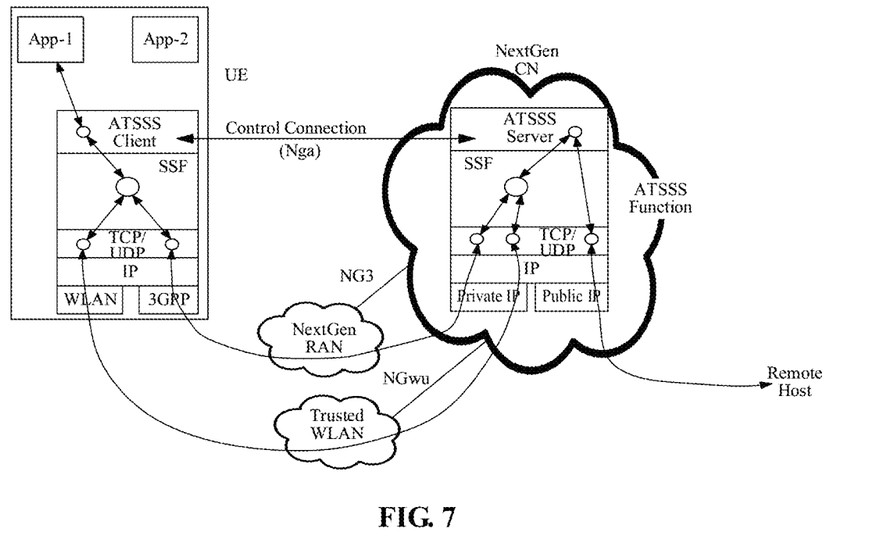
FIG. 7 is a schematic diagram of a data transmission process according to an embodiment of the disclosure.

Based on the same inventive concept of the abovementioned embodiments, the technical solutions of the abovementioned embodiments are elaborated in the embodiment through a specific example. In the specific example, a service access management node AT3SF may be distributed in a network element with a data transmission requirement in a 5G core network, for example, a UDM, an SMF, a PCF, an SMF and a UPF, and is also arranged in UE. Referring to an architecture diagram illustrated in FIG. 5, an access device of the UE not only includes an access device supporting a 3GPP specification, i.e., 3GPP Access, for example, a gNB or an eNB, but also includes an access device supporting a non-3GPP specification, i.e., Non-3GPP Access, for example, a WIFI access point. Based on the architecture illustrated in FIG. 5, distribution control may be implemented for an uplink data stream to be transmitted or a downlink data stream to be transmitted according to the solutions of the abovementioned two embodiments. The technical solutions of the embodiments of the disclosure involve the service access management node and the access device. Therefore, in the architecture illustrated in FIG. 5, architecture parts of interest are illustrated in FIG. 6. ATSSSFunction represents the service access management node, UP Function is a user-plane network device of the core network, TrustedWLAN may specifically be the WIFI access point and represents an access device in a non-3GPP access network, and NextGenRAN may specifically be the gNB and represents an access device in a 3GPP access network. During data transmission for a service, the UE or the ATSSSFunction may split a data stream to be transmitted for simultaneous transmission in the non-3GPP access network and the 3GPP access network to improve a throughput of the service. Specifically, in a network protocol stack, a data transmission process is illustrated in FIG. 7. Each of a core network side and the UE has communication links of multiple access networks. The core network side or the UE needs to divide the data stream to be transmitted for transmission in the communication link of each access network, so that the service access management node can determine, based on an access state report reported by each access device, a distributed data amount of the data stream to be transmitted according to the solutions of the abovementioned embodiments.

For example, in the schematic transmission process illustrated in FIG. 7, an application program APP-1 in the UE is required to perform data transmission with a network side. The service access management node may be arranged at the UE and between the access network and the core network in a client/server (C/S) form. For example, in FIG. 7, the ATSSS client is in the UE, and the ATSSS Function entity between the access network and the core network is an ATSSS server. There is a control connection channel Control Connection between the ATSSS client and the ATSSS server, so that control information for multi-connection data transmission may be transmitted between the ATSSS client and the ATSSS server. The service management node may receive an access state report from each of a first access device providing a RAN and a second access device providing a wireless local area network (WLAN). The access state report includes multiple pieces of network state information used for characterizing a network state of the access network. The service management node divides a data stream to be transmitted according to superiority-inferiority of the network state characterized by the network state information of each access network and determines a distributed data amount corresponding to the access device, namely determining a distributed data amount of the communication link of the access device. A specific determination process is illustrated in FIG. 3 in the first embodiment, and elaborations thereof are omitted herein. When any one of the ATSSS client or the ATSSS server completes determining the distributed data amount of the communication link of each access network, the opposite side may be notified through Control Connection, thereby enabling the opposite side to distribute the data stream to be transmitted according to the distributed data amount.

Fourth Embodiment

Figure 8:
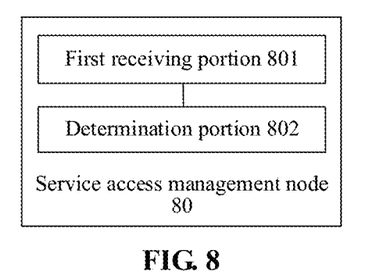
FIG. 8 is a schematic composition diagram of a service access management node according to an embodiment of the disclosure.

Based on the same inventive concept of the abovementioned embodiments, referring to FIG. 8, a service access management node 80 provided in the embodiment of the disclosure is illustrated, which may include a first receiving portion 801 and a determination portion 802.

The first receiving portion 801 is configured to receive an access state report from each of at least one access device, where the access state report includes multiple pieces of network state information for characterizing a network state of an access network provided by the access device.

The determination portion 802 is configured to determine a distributed data amount corresponding to the access device based on a data stream to be transmitted and the network state information of the access network provided by the access device.

In a possible implementation, when the access network provided by the access device is an access network supporting a non-3GPP specification, the access state report includes at least one piece of the following network state information: BSS load information, WAN metrics information, a utilization rate of an available channel, a data amount to be transmitted, or a number of accessed UEs.

In a possible implementation, when the access network provided by the access device is an access network supporting a 3GPP specification, the access state report includes at least one piece of the following network state information: load information of the access network, a number of accessed UEs of the access network, a data amount to be transmitted presently cached by the access network, a present resource utilization rate of the access network, a user throughput of the access network within a preset time period, or information about a data packet that is not transmitted correctly by the access network.

In the possible implementation, the information about the data packet that is not transmitted correctly by the access network includes at least one of:

a sequence number of a data packet that has been transmitted but not transmitted successfully by the access network;

a minimum sequence number among sequence numbers of data packets to be transmitted by the access network; or a proportion of a number of data packets that are transmitted wrongly by the access network to a total number of data packets that are transmitted by the access network within the preset time period.

Figure 9:
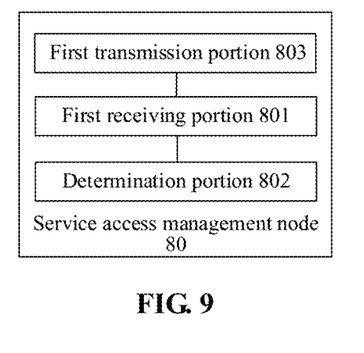
FIG. 9 is a schematic composition diagram of another service access management node according to an embodiment of the disclosure.

In a possible implementation, referring to FIG. 9, the service access management node 80 further includes a first transmission portion 803, configured to transmit a request message for the access state report to the access device.

In a possible implementation, the first receiving portion 801 is configured to:

receive the access state report from the access device according to a preset periodic interval.

In a possible implementation, the first receiving portion 801 is configured to:

receive the access state report transmitted by the access device based on a preset triggering event.

In a possible implementation, the determination portion 802 is configured to:

allocate, according to a set weight allocation strategy, a weight to the network state information of the access network provided by access device;

acquire, based on the network state information of the access network provided by the access device and the weight corresponding to the network state information, a data distribution calculated value corresponding to the access network provided by the access device; and divide the data stream to be transmitted based on the data distribution calculated value corresponding to the access network provided by the access device to determine the distributed data amount corresponding to the access device.

It may be understood that, in the embodiment, "portion" may be part of a circuit, part of a processor, part of a program or software and the like, of course, may also be a unit, and may also be modular and non-modular.

In addition, each component in the embodiment may be integrated into a processing unit, each unit may also exist independently, and two or more than two units may also be integrated into a unit. The integrated unit may be implemented in a hardware form and may also be implemented in form of software function module.

When implemented in form of software function module and sold or used not as an independent product, the integrated unit may be stored in a computer-readable storage medium. Based on such an understanding, the technical solution of the embodiment substantially or parts making contributions to the conventional art or all or part of the technical solution may be embodied in form of software product, and the computer software product is stored in a storage medium, including a plurality of instructions configured to enable a computer device (which may be a personal computer, a server, a network device or the like) or a processor to execute all or part of the steps of the method in the embodiment. The storage medium includes: various media capable of storing program codes such as a U disk, a mobile hard disk, a read only memory (ROM), a random access memory (RAM), a magnetic disk or an optical disk.

Therefore, the embodiment provides a computer-readable medium having stored therein a data distribution program that, when executed by at least one processor, causes the at least one processor to implement the method of the first embodiment.

Figures 10, 11:
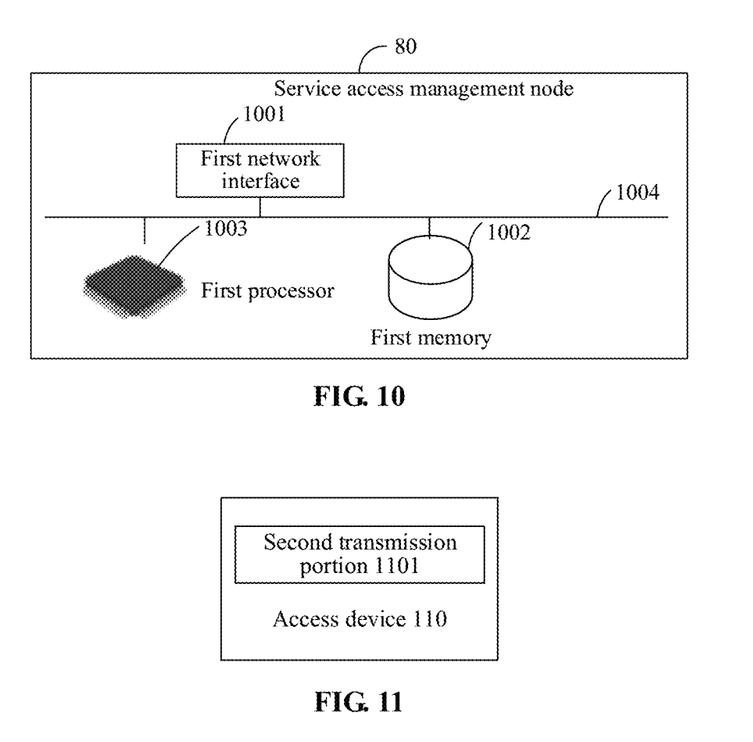
FIG. 10 is a specific hardware structure diagram of a service access management node according to an embodiment of the disclosure.
FIG. 11 is a composition schematic diagram of an access device according to an embodiment of the disclosure.

Based on the composition of the service access management node 80 and the computer-readable medium, a specific hardware structure of the service access management node 80 provided in the embodiment of the disclosure is illustrated in FIG. 10. The service access management node 80 may include a first network interface 1001, a first memory 1002 and a first processor 1003. All components are coupled together through a bus system 1004. It may be understood that the bus system 1004 is configured to implement connection communication among these components. The bus system 1004 includes a data bus and further includes a power bus, a control bus and a state signal bus. However, for clear description, various buses are marked as the bus system 1004 in FIG. 10. The first network interface 1001 is configured to receive and send a signal in a process of receiving and transmitting information with another external network element.

The first memory 1002 is configured to store a computer program capable of running in the first processor 1003.

The first processor 1003 is configured to run the computer program to execute the following operations.

An access state report transmitted by each of at least one access device is received. The access state report includes multiple pieces of network state information for characterizing a network state of an access network provided by the access device.

A distributed data amount corresponding to the access device is determined based on a data stream to be transmitted and the network state information of the access network provided by the access device.

It may be understood that the first memory 1002 in the embodiment of the disclosure may be a volatile memory or a nonvolatile memory, or may include both the volatile and nonvolatile memories. The nonvolatile memory may be a ROM, a programmable ROM (PROM), an erasable PROM (EPROM), an electrically EPROM (EEPROM) or a flash memory. The volatile memory may be a RAM, and is used as an external high-speed cache. It is exemplarily but unlimitedly described that RAMs in various forms may be adopted, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM) and a direct rambus RAM (DRRAM). It is to be noted that the first memory 1002 of a system and method described in the disclosure is intended to include, but not limited to, memories of these and any other proper types.

The first processor 1003 may be an integrated circuit chip with a signal processing capability. In an implementation process, each operation of the method may be completed by an integrated logic circuit of hardware in the first processor 1003 or instructions in a software form. The first processor 1003 may be a universal processor, a digital signal processor (DSP), an application specific integrated circuit (ASIC), a field programmable gate array (FPGA) or another programmable logic device (PLD), discrete gate or transistor logical device and discrete hardware component. Each method, operation and logical block diagram disclosed in the embodiment of the disclosure may be implemented or executed. The universal processor may be a microprocessor or the processor may also be any conventional processor and the like. The operations of the method disclosed in combination with the embodiment of the disclosure may be directly embodied to be executed and completed by a hardware decoding processor or executed and completed by a combination of hardware and software modules in the decoding processor. The software module may be located in a mature storage medium in this field such as a RAM, a flash memory, a ROM, a PROM or EEPROM and a register. The storage medium is located in the first memory 1002. The first processor 1003 reads information from the first memory 1002 and completes the operations of the method in combination with hardware.

It may be understood that these embodiments described in the disclosure may be implemented by hardware, software, firmware, middleware, a microcode or a combination thereof. In case of implementation with the hardware, the processing unit may be implemented in one or more ASICs, DSPs, DSP devices (DSPDs), PLDs, FPGAs, universal processors, controllers, microcontrollers, microprocessors, other electronic units configured to execute the functions in the application or combinations thereof.

In case of implementation with the software, the technology of the disclosure may be implemented through the modules (for example, processes and functions) executing the functions in the disclosure. A software code may be stored in the memory and executed by the processor. The memory may be implemented in the processor or outside the processor.

Specifically, the first processor 1003 in the service access management node 80 is further configured to run the computer program to execute the operations of the method in embodiment 1. Elaborations are omitted herein.

Fifth Embodiment

Based on the same inventive concept of the abovementioned embodiments, referring to FIG. 11, a composition of an access device 110 provided in the embodiment of the disclosure is illustrated. The access device 110 may include a second transmission portion 1101, configured to transmit an access state report of an access network provided by the access device 110 to a service access management node. The access state report includes multiple pieces of network state information for characterizing a network state of the access network provided by the access device 110 and is further used for the service access management node to determine a distributed data amount corresponding to the access device 110 according to a data stream to be transmitted.

In a possible implementation, when the access network provided by the access device 110 is an access network supporting a non-3GPP specification, the access state report includes at least one piece of the following network state information: BSS load information, WAN metrics information, a utilization rate of an available channel, a data amount to be transmitted, or a number of accessed UEs.

In a possible implementation, when the access network provided by the access device 110 is an access network supporting a 3GPP specification, the access state report includes at least one piece of the following network state information: load information of the access network, a number of accessed UEs of the access network, a data amount to be transmitted presently cached by the access network, a present resource utilization rate of the access network, a user throughput of the access network within a preset time period, or information about a data packet that is not transmitted correctly by the access network.

In the possible implementation, the information about the data packet that is not transmitted correctly by the access network includes at least one of:

a sequence number of a data packet that has been transmitted but not transmitted successfully by the access network;

a minimum sequence number among sequence numbers of data packets to be transmitted by the access network; or a proportion of a number of data packets that are transmitted wrongly by the access network to a total number of data packets that are transmitted by the access network within the preset time period.

Figure 12:
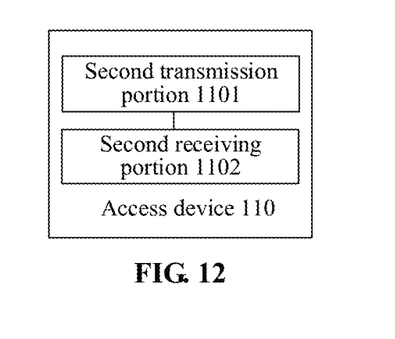
FIG. 12 is a composition schematic diagram of another access device according to an embodiment of the disclosure.

In a possible implementation, referring to FIG. 12, the access device 110 further includes a second receiving portion 1102, configured to receive a request message for the access state report from the service access management node.

In the implementation, the second transmission portion 1101 is configured to transmit the access state report of the access network provided by the access device 110 to the service access management node based according to a preset periodic interval.

In the implementation, the second transmission portion 1101 is configured to transmit the access state report of the access network provided by the access device 110 to the service access management node based on a preset triggering event.

In the implementation, the second transmission portion 1101 is configured to:

when the network state information characterized in the access state report and a pre-configured threshold satisfy a preset judgment condition, transmit the access state report of the access network provided by the access device 110 to the service access management node; or, when the network state information characterized in the access state report and the pre-configured threshold satisfy the preset judgment condition, transmit the access state report of the access network provided by the access device 110 to the service access management node according to the preset periodic interval until the judgment condition is not satisfied; or, when the network state information characterized in the access state report and the pre-configured threshold satisfy the preset judgment condition, transmit the access state report of the access network provided by the access device 110 to the service access management node according to the preset periodic interval until timeout of a set timing period; or, when the network state information characterized in the access state report and the pre-configured threshold satisfy the preset judgment condition, transmit the access state report of the access network provided by the access device 110 to the service access management node according to a predefined number of transmission times.

In addition, the embodiment also provides a computer-readable medium having stored therein a data distribution program that, when executed by at least one processor, causes the at least one processor to implement the method of the second embodiment.

Figure 13:
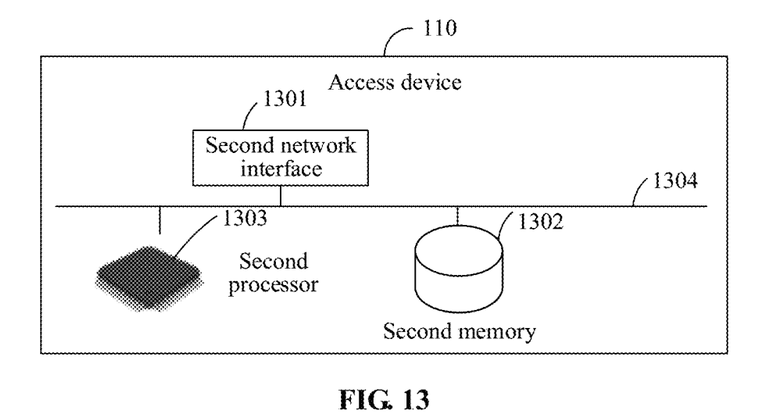
FIG. 13 is a specific hardware structure diagram of an access device according to an embodiment of the disclosure.

Specific elaborations about the computer-readable medium refer to the descriptions in the fourth embodiment and are omitted herein. Based on the composition of the access device 110 and the computer-readable medium, a specific hardware structure of the access device 110 provided in the embodiment of the disclosure is illustrated in FIG. 13. The access device 110 may include a second network interface 1301, a second memory 1302 and a second processor 1303. All components are coupled together through a bus system 1304. It may be understood that the bus system 1304 is configured to implement connection communication between these components. The bus system 1304 includes a data bus and further includes a power bus, a control bus and a state signal bus. However, for clear description, various buses are marked as the bus system 1304 in FIG. 13.

Herein, the second network interface 1301 is configured to receive and send a signal in a process of receiving and transmitting information with another external network element.

The second memory 1302 is configured to store a computer program capable of running in the second processor 1303.

The second processor 1303 is configured to run the computer program to execute the following operations.

An access state report of an access network provided by the access device is transmitted to a service access management node. The access state report includes multiple pieces of network state information for characterizing a network state of the access network provided by the access device and further is used for the service access management node to determine a distributed data amount corresponding to the access device according to a data stream to be transmitted.

It may be understood that portions in the specific hardware structure of the access device 110 in the embodiment are similar to the corresponding portions in the fourth embodiment and will not be elaborated herein.

Specifically, the second processor 1303 in the access device 110 is further configured to run the computer program to execute the operations of the method in the second embodiment. Elaborations are omitted herein.

Sixth Embodiment

Figure 14:
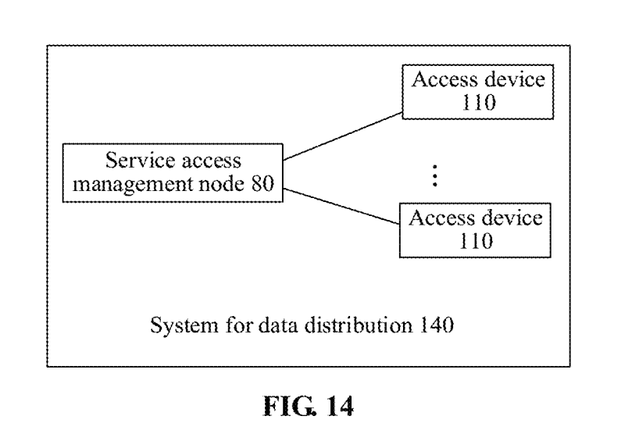
FIG. 14 is a schematic composition diagram of a system for data distribution according to an embodiment of the disclosure.

Based on the same inventive concept of the abovementioned embodiments, referring to FIG. 14, a data distribution system 140 provided in the embodiment of the disclosure is illustrated. The system 140 is characterized by including a service access management node 80 and at least one access device 110.

The access device 110 is configured to transmit an access state report of an access network provided by the access device 110 to the service access management node 80, where the access state report includes multiple pieces of network state information for characterizing a network state of the access network provided by the access device 110.

The service access management node 80 is configured to receive the access state report from each of the at least one access device 110 and determine a distributed data amount corresponding to the access device 110 based on a data stream to be transmitted and the network state information of the access network provided by each access device 110.

In a specific implementation process, the service access management node 80 in the embodiment may preferably be the service access management node 80 in any abovementioned embodiment, and the access device 110 may preferably be the access device 110 in any abovementioned embodiment.

Those skilled in the art should know that the embodiment of the disclosure may be provided as a method, a system or a computer program product. Therefore, the disclosure may adopt a form of hardware embodiment, software embodiment or combined software and hardware embodiment. Moreover, the disclosure may adopt a form of computer program product implemented on one or more computer-available storage media (including, but not limited to, a disk memory and an optical memory) including computer-available program codes.

The disclosure is described with reference to flowcharts and/or block diagrams of the method, device (system) and computer program product according to the embodiments of the disclosure. It is to be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of another programmable data processing device to generate a machine, so that a device for realizing a function specified in one flow or multiple flows in the flowcharts and/or one block or multiple blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction device may be generated by the instructions stored in the computer-readable memory, the instruction device realizing the function specified in one flow or multiple flows in the flowcharts and/or one block or multiple blocks in the block diagrams.

These computer program instructions may further be loaded onto the computer or the other programmable data processing device, so that a series of operating steps are executed on the computer or the other programmable data processing device to generate processing implemented by the computer, and steps for realizing the function specified in one flow or multiple flows in the flowcharts and/or one block or multiple blocks in the block diagrams are provided by the instructions executed on the computer or the other programmable data processing device.

The above is only the preferred embodiment of the disclosure and not intended to limit the scope of protection of the disclosure.

INDUSTRIAL APPLICABILITY

In the embodiments, the service access management node receives the access network state report from each access device to learn the network state information of the access network provided by the access device, divides the data stream to be transmitted based on the network state information of the access network, and determines the distributed data amount corresponding to the access device, thereby implementing multi-connection data transmission control for the data stream to be transmitted and improving the throughput of the service data.

The invention claimed is:

1. A method for data distribution, performed by a service access management node, the method comprising:
   receiving an access state report from each of at least two access devices, wherein the access state report comprises at least one piece of network state information for characterizing a network state of an access network provided by the access device; and
   determining a distributed data amount corresponding to each of the at least two access devices based on a data stream to be transmitted and the at least one piece of network state information of the access network provided by the access device,
   wherein determining the distributed data amount corresponding to each of the at least two access devices based on the data stream to be transmitted and the at least one piece of network state information of the access network provided by the access device comprises:
   allocating, according to a weight allocation strategy, a weight to each of the at least one piece of network state information of the access network provided by each of the at least two access devices, the weight allocation strategy indicating a weight corresponding to each of the at least one piece of network state information;
   determining a data distribution calculated value corresponding to the access network provided by the access device by multiplying content of each of the at least one piece of network state information with a corresponding weight and summing the product results of each of the at least one piece of the network state information; and
   dividing the data stream to be transmitted based on the data distribution calculated value corresponding to the access network provided by each of the at least two access devices to determine the distributed data amount corresponding to the access device.

2. The method of claim 1, wherein when the access network provided by each of the at least two access devices is an access network supporting a non-3rd generation partnership project (3GPP) specification, the access state report comprises at least one piece of the following network state information: basic service set (BSS) load information, wide area network (WAN) metrics information, a utilization rate of an available channel, a data amount to be transmitted, or a number of accessed user equipments (UEs).

3. The method of claim 1, wherein when the access network provided by each of the at least two access devices is an access network supporting a 3GPP specification, the access state report comprises at least one piece of the following network state information: load information of the access network, a number of accessed UEs of the access network, a data amount to be transmitted presently cached by the access network, a present resource utilization rate of the access network, a user throughput of the access network within a preset time period, or information about a data packet that is not transmitted correctly by the access network.

4. The method of claim 3, wherein the information about the data packet that is not transmitted correctly by the access network comprises at least one of:
   a sequence number of a data packet that has been transmitted but not transmitted successfully by the access network;
   a minimum sequence number among sequence numbers of data packets to be transmitted by the access network; or
   a proportion of a number of data packets that are transmitted wrongly by the access network to a total number of data packets that are transmitted by the access network within the preset time period.

5. The method of claim 1, further comprising: before receiving the access state report from each of the at least two access devices,
   transmitting a request message for the access state report to the access device.

6. The method of claim 1, wherein receiving the access state report from each of the at least two access devices comprises:
   receiving the access state report from each of the at least two access devices according to a preset periodic interval.

7. The method of claim 1, wherein receiving the access state report from each of the at least two access devices comprises:
   receiving the access state report transmitted by each of the at least two access devices based on a preset triggering event.

8. A method for data distribution, performed by an access device, the method comprising:
   transmitting an access state report of an access network provided by each of the at least two access devices to a service access management node, wherein the access state report comprises at least one piece of network state information for characterizing a network state of the access network provided by the access device, and is used for the service access management node to determine a distributed data amount corresponding to the access device according to a data stream to be transmitted;
   wherein determining the distributed data amount corresponding to the access device according to a data stream to be transmitted comprises:
   allocating, according to a weight allocation strategy, a weight to each of the at least one piece of network state information of the access network provided by each of the at least two access devices, the weight allocation strategy indicating a weight corresponding to each of the at least one piece of network state information;
   determining a data distribution calculated value corresponding to the access network provided by the access device by multiplying content of each of the at least one piece of network state information with a corresponding weight and summing the product results of each of the at least one piece of the network state information; and
   dividing the data stream to be transmitted based on the data distribution calculated value corresponding to the access network provided by each of the at least two access devices to determine the distributed data amount corresponding to the access device.

9. The method of claim 8, wherein when the access network provided by each of the at least two access devices is an access network supporting a non-3rd generation partnership project (3GPP) specification, the access state report comprises at least one piece of the following network state information: basic service set (BSS) load information, wide area network (WAN) metrics information, a utilization rate of an available channel, a data amount to be transmitted, or a number of accessed user equipments (UEs).

10. The method of claim 8, wherein when the access network provided by each of the at least two access devices is an access network supporting a 3GPP specification, the access state report comprises at least one piece of the following network state information: load information of the access network, a number of accessed UEs of the access network, a data amount to be transmitted presently cached by the access network, a present resource utilization rate of the access network, a user throughput of the access network within a preset time period, or information about a data packet that is not transmitted correctly by the access network.

11. The method of claim 8, wherein transmitting the access state report of the access network provided by each of the at least two access devices to the service access management node comprises:
  transmitting the access state report of the access network provided by each of the at least two access devices to the service access management node based on a preset triggering event.

12. The method of claim 11, wherein transmitting the access state report of the access network provided by each of the at least two access devices to the service access management node based on the preset triggering event comprises:
  when the network state information characterized in the access state report and a pre-configured threshold satisfy a preset judgment condition, transmitting the access state report of the access network provided by each of the at least two access devices to the service access management node; or,
  when the network state information characterized in the access state report and a pre-configured threshold satisfy a preset judgment condition, transmitting the access state report of the access network provided by each of the at least two access devices to the service access management node according to the preset periodic interval until the judgment condition is not satisfied; or,
  when the network state information characterized in the access state report and a pre-configured threshold satisfy a preset judgment condition, transmitting the access state report of the access network provided by each of the at least two access devices to the service access management node according to the preset periodic interval until timeout of a set timing period; or,
  when the network state information characterized in the access state report and a pre-configured threshold satisfy a preset judgment condition, transmitting the access state report of the access network provided by each of the at least two access devices to the service access management node according to a predefined number of transmission times.

13. An access device, comprising: a second processor and a second network interface, the second processor being configured to transmit, through the second network interface, an access state report of an access network provided by each of the at least two access devices to a service access management node, wherein the access state report comprises at least one piece of network state information for characterizing a network state of the access network provided by the access device, and is used for the service access management node to determine a distributed data amount corresponding to the access device according to a data stream to be transmitted,
  wherein determining the distributed data amount corresponding to the access device according to a data stream to be transmitted comprises:
    allocating, according to a weight allocation strategy, a weight to each of the at least one piece of network state information of the access network provided by each of the at least two access devices, the weight allocation strategy indicating a weight corresponding to each of the at least one piece of network state information;
    determining a data distribution calculated value corresponding to the access network provided by the access device by multiplying content of each of the at least one piece of network state information with a corresponding weight and summing the product results of each of the at least one piece of the network state information; and
    dividing the data stream to be transmitted based on the data distribution calculated value corresponding to the access network provided by each of the at least two access devices to determine the distributed data amount corresponding to the access device.

14. The access device of claim 13, wherein when the access network provided by each of the at least two access devices is an access network supporting a non-3rd generation partnership project (3GPP) specification, the access state report comprises at least one piece of the following network state information: basic service set (BSS) load information, wide area network (WAN) metrics information, a utilization rate of an available channel, a data amount to be transmitted, or a number of accessed user equipments (UEs).

15. The access device of claim 13, wherein when the access network provided by each of the at least two access devices is an access network supporting a 3GPP specification, the access state report comprises at least one piece of the following network state information: load information of the access network, a number of accessed UEs of the access network, a data amount to be transmitted presently cached by the access network, a present resource utilization rate of the access network, a user throughput of the access network within a preset time period, or information about a data packet that is not transmitted correctly by the access network.

16. The access device of claim 15, wherein the information about the data packet that is not transmitted correctly by the access network comprises at least one of:
  a sequence number of a data packet that has been transmitted but not transmitted successfully by the access network;
  a minimum sequence number among sequence numbers of data packets to be transmitted by the access network; or
  a proportion of a number of data packets that are transmitted wrongly by the access network to a total number of data packets that are transmitted by the access network within the preset time period.

17. The access device of claim 13, the second processor is further configured to receive, through the second network interface, a request message for the access state report from the service access management node.

18. The access device of claim 13, wherein the second processor is further configured to transmit, through the second second network interface, the access state report of the access network provided by each of the at least two access devices to the service access management node according to a preset periodic interval.

19. The access device of claim 13, wherein the second processor is further configured to transmit, through the second network interface, the access state report of the access network provided by the each of the at least two access devices to the service access management node based on a preset triggering event.

\* \* \* \* \*